William C. Moser's
Butter Worker

71318

PATENTED
NOV 26 1867

Witnesses
Frank Gards
Morgan W. Jellett

Inventor
William C. Moser
per Francis D. Pastorius
Attorney

United States Patent Office.

WILLIAM C. MOSER, OF EAST NANTMEAL TOWNSHIP, PENNSYLVANIA.

Letters Patent No. 71,318, dated November 26, 1867.

IMPROVEMENT IN BUTTER-WORKER.

The Schedule referred to in these Letters Patent and making part of the same.

TO ALL WHOM IT MAY CONCERN:

Be it known that I, WILLIAM C. MOSER, of East Nantmeal township, in the county of Chester, and State of Pennsylvania, have invented a new and useful Machine for Working Butter; and I do hereby declare that the following is a full, clear, and exact description of the same, reference being had to the accompanying drawing, and to the letters of reference marked thereon, making part of this specification, in which—

Figure 1:
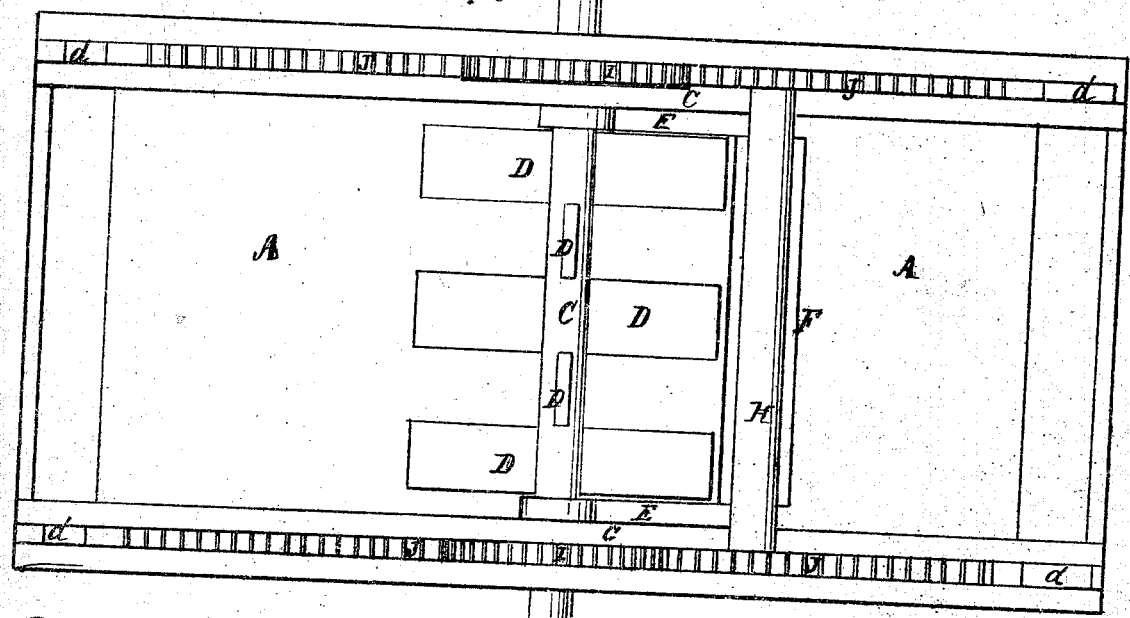

Figure 1 is a plan view, and

Figure 2:
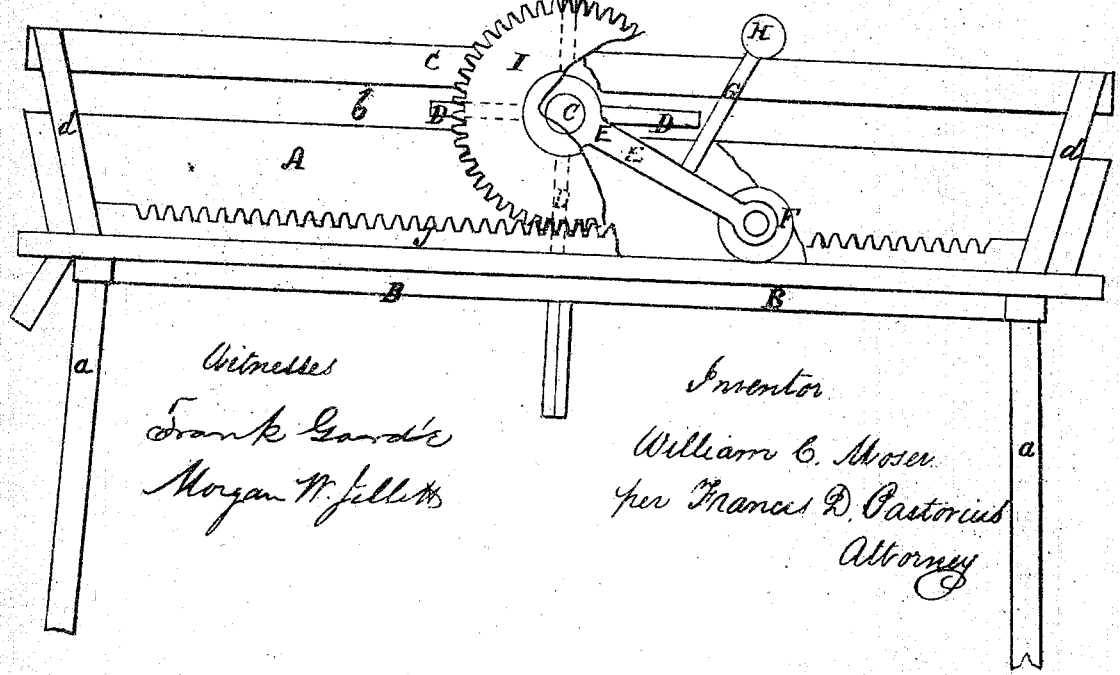

Figure 2 a side elevation, partly sectioned.

Similar letters refer to similar parts in the two views.

A is a rectangular trough or box, having enclosed sides and ends, and open at the top, and mounted on legs a. B is a pan, fixed to the under side of the box A, so as to be readily removed at will. C is a shaft, placed transversely at the top of the trough A. Its journals take into guide-slots b b, formed on each side of the machine by the sides of the box A and the rails c c, which are held in place by the uprights d d, near the ends of the sides of the box, by which means the shaft is retained transversely, and at the same time allowed a perfectly free longitudinal motion. The shaft C is provided with radial paddles D D, which extend to near the bottom of the box A. E E are vibrating arms on the ends of the shaft C, adjacent to the inner sides of the trough. A squeezer-roller, F, is pivoted to their outer ends, and the uprights G G, which carry the handle H, are fixed to them, projecting upward at right angles, or nearly. I are pinion-wheels on the journals of the shaft C, outside of the box A. Each takes into a rack, J, fixed to the side and near the bottom of the trough or box. Contrary to the principle of the working of a rack and pinion, the racks J are, in this instance, fixed and immovable, and the pinions I travel over them.

The operation of my machine is as follows: The squeezer-roller F is raised clear of the bottom of the box A, by vibrating the arms E on the shaft C. The butter to be worked is then placed in the trough, and the squeezer-roller lowered. The pan B is filled with ice or warm water, according to the consistency of the butter. The operator holds the handle H, and applies the necessary pressure and motion to the vibrating arms, and thereby to the squeezer-roller, for properly working the butter free of its buttermilk. At the same time the pinions are rotated by power applied to the shaft C, whereby they are caused, by gearing into the racks, to travel from end to end of the trough. The radial paddles D rotate with the shaft C, and sweep the butter back towards the squeezer-roller, if the pinions are travelling in one direction, and from it, if travelling in a contrary direction, thus exposing every portion of the butter successively to the action of the roller. The buttermilk and the aqueous particles run down the inclined bottom of the trough, and escape through a drip-pipe.

What I claim as my invention, and desire to secure by Letters Patent, is—

1. The machine as a whole, when combined, arranged, and operated substantially as shown and described.

2. The shaft C, paddles D, vibrating arms E, squeezer-roller F, uprights G, and the handle H, substantially as shown and described.

In testimony whereof I hereunto sign my name to this specification in presence of two subscribing witnesses.

WILLIAM C. MOSER.

Witnesses:
 JOHN B. MOSER,
 LOUIS A. MATOS.